United States Patent [19]
Tastayre

[11] Patent Number: 5,510,037
[45] Date of Patent: Apr. 23, 1996

[54] REGENERATION OF USED CLEANING SOLUTION

[76] Inventor: Gilles Tastayre, c/o Ecochimie Ltee, 1777 - E, de Nobel, Sainte Julie de Vercheres, Quebec, Canada, J3E 1Z6

[21] Appl. No.: 324,492

[22] Filed: Oct. 18, 1994

Related U.S. Application Data

[63] Continuation of Ser. No. 17,400, Feb. 12, 1993, abandoned.

[51] Int. Cl.$^6$ .................................................... C02F 9/00
[52] U.S. Cl. .......................................... 210/666; 210/669
[58] Field of Search ........................... 210/665, 666, 210/667, 669, 727, 728

[56] References Cited

U.S. PATENT DOCUMENTS

| | | | |
|---|---|---|---|
| 4,655,934 | 4/1987 | Rose et al. | 210/728 |
| 4,783,265 | 11/1988 | Timmons | 210/666 |

FOREIGN PATENT DOCUMENTS

| | | |
|---|---|---|
| 424532 | 12/1944 | Canada . |
| 428472 | 7/1945 | Canada . |
| 431817 | 12/1945 | Canada . |
| 438243 | 11/1946 | Canada . |
| 450605 | 8/1948 | Canada . |
| 773616 | 12/1967 | Canada . |
| 803576 | 1/1969 | Canada . |
| 830531 | 12/1969 | Canada . |
| 849034 | 8/1970 | Canada . |
| 1024671 | 1/1978 | Canada . |
| 2012201 | 9/1990 | Canada . |
| 2006512 | 5/1991 | Canada . |
| 2534900 | 4/1984 | France . |
| 2142839 | 1/1985 | United Kingdom . |

*Primary Examiner*—Ivars Cintins

[57] ABSTRACT

A process for regenerating spent cleaning solutions. The process involves the sequential steps of first preconditioning the spent solution. Then, an absorbent material is added to the preconditioned solution to provide an interactive solution. Suitable precipitation agents are added to the interactive solution to precipitate undesirable materials from the solution. The precipitating of the undesirable materials from the interactive solution is accomplished by adding an anionic and a cationic polymeric flocculating agent thereto, in the sequence of steps (i) adding one of the anionic or cationic polymeric flocculating agent to the interactive solution to provide a reactive solution, (ii) thoroughly mixing the reactive solution, and (iii) adding the other of the anionic or cationic flocculating agent, thereby precipitating insoluble salts as flocs. Finally, the solution containing the precipitated flocs is subjected to a solid/liquid separation.

18 Claims, 1 Drawing Sheet

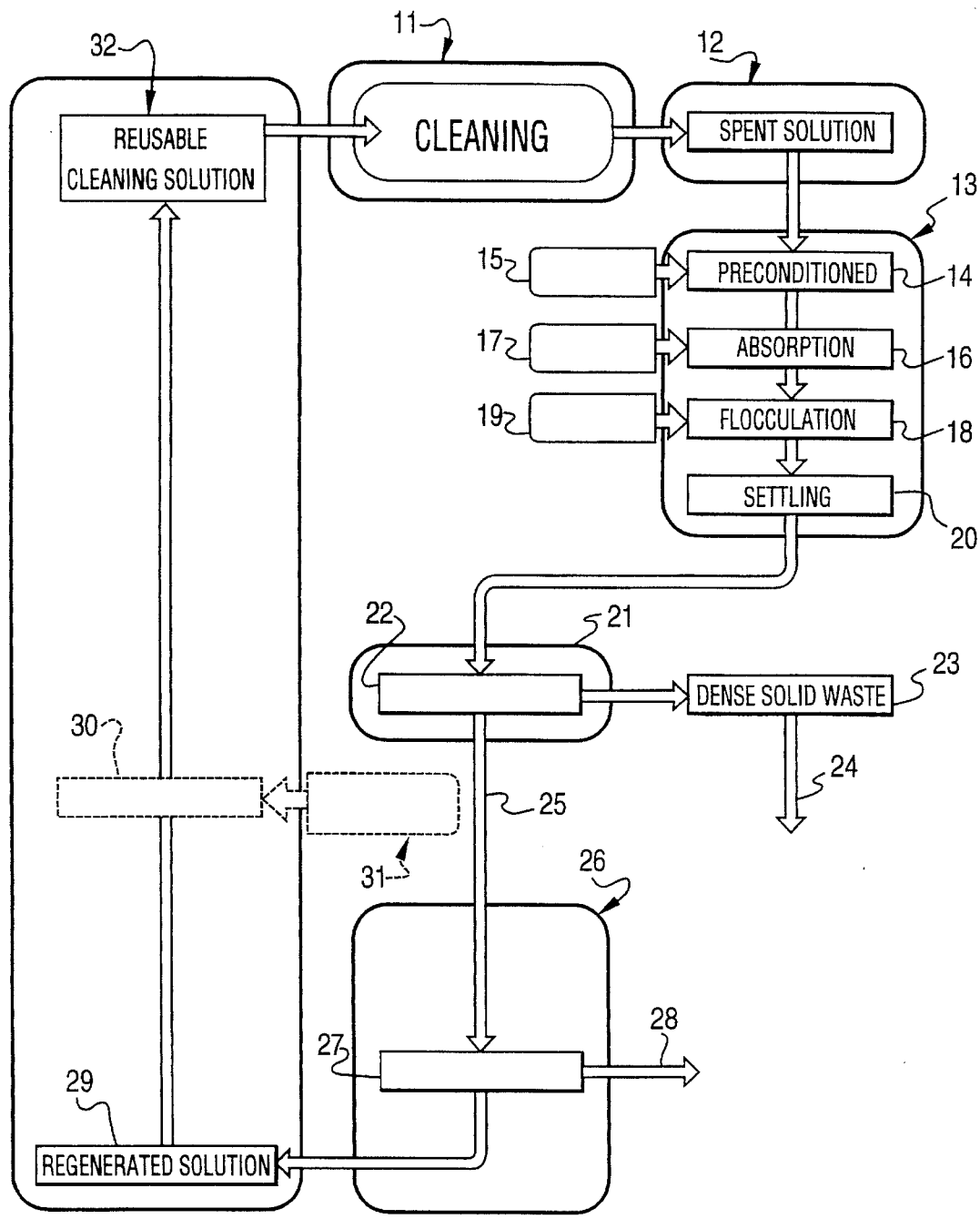

REGENERATION OF USED CLEANING SOLUTION

This is a continuation of application Ser. No. 08/017,400 filed on Feb. 12, 1993, now abandoned.

BACKGROUND OF THE INVENTION (a) Field of the Invention

This invention relates to the regeneration of used cleaning solution which may be alkaline, neutral or acidic.

(b) Description of the Prior Art

It is known to clean and clarify water by adding one or more coagulating agents to water to combine fine particles therein into flocs and thereby to sediment the flocs by gravity. In this known method, water is separated into a floc phase and an aqueous phase. The thus separated flocs are removed from the treating vessel and are dewatered, i.e., dehydrated, and the solids discarded. The separated water is finally returned to rivers.

It is also well known that metal ions dissolved in water can be removed by the addition of various treatment agents which react with the metal ions and precipitate them as insoluble salts. This is of use in the treatment of contaminated water when, for example, the addition of calcium hydroxide (lime) to hard water will cause the precipitation of metal carbonates and so remove the metal and bicarbonate ions from the water. This precipitation process can be further improved by the addition to the water of a polyelectrolyte which promotes the flocculation of the solid particles and a weighting agent, e.g., calcium carbonate, which increases the specific gravity of the flocculated matter and therefore increases the rate of sedimentation and thus the rate of clarification of the liquor.

It is also known to remove suspended solid materials from water by the addition of coagulants, e.g., aluminum sulfate, iron chloride etc., which are normally employed along with lime in conjunction with sedimentation and/or filtration procedures. The coagulants, and frequently a coagulant aid, assist the building of a floc to a proper size for settling; sedimentation units permit the separation of the relatively slow settling floc thus formed from the purified water.

The patent literature also purports to be directed to the problem of purifying of solutions.

British Patent No. 2,095,226 describes a composition which is of use in the purification of water and which contains an alkaline earth metal hydroxide and an anionic oligomeric polyelectrolyte and may additionally contain a weighting agent and a cationic polyelectrolyte.

British Patent No. 2,157,278 described a method of treating water using a composition containing calcium sulphate as a weighting agent, an electrolyte having a multivalent cation, e.g., iron (III) or aluminum and a cationic or anionic polyelectrolyte. In such patent, the polyelectrolyte used was cationic.

Canadian Patent No. 2,006,512 patented Dec. 22, 1989 by A. Timmons provided a method for the purification of contaminated water. The treatment involved the application to the water of anionic and cationic coagulants at different stages. Between the application of the coagulants, precipitation agents were added to precipitate the contaminants which typically were metal ions in solution. The coagulants were polyelectrolytes. It was taught that the first added coagulant caused formation of a floc and the addition of the second coagulant caused heavy deposition of contaminants. Separation followed and the separated solids were passed to a sludge thickening tank, while the separated liquid could be filtered to provide clean water which could be returned to a stream or river.

Canadian Patent No. 2,012,201 patented Mar. 14, 1990 by S. D. Kamato et al, provided a method for treating water which included adding a first chemical containing an alkali metal or alkaline earth metal oxide or hydroxide to the water to be treated, thereby rendering muddy water alkaline. A second chemical containing an anionic polymer coagulant was added to the water, either simultaneously with, or after, the addition of the first chemical. A third chemical containing a sulfate was then added, thereby rendering the water weakly alkaline. Finally, a fourth chemical containing an anionic polymer coagulant was added to the muddy water. As a result, large-sized and hard flocs were produced. When the water was in the weakly alkaline state, an anionic polymer coagulant was added to the muddy water to cause remaining fine particles, the hydroxide and the metal ions to be combined, resulting in larger-sized and harder flocs.

Because cleaning is a complex technology whose efficacy is governed by four parameters, namely time, temperature, concentration, and shear. Some cleaning solutions contain detergents to remove soils, and/or compounded alkalis and caustics to react upon organic residues. Other such cleaning solutions may contain acids to remove inorganics and minerals.

SUMMARY OF THE INVENTION (a) Aims of the Invention

In spite of these teachings, there is still a need for further improvements, and in particular there is a need for the regeneration of used such alkaline or acid cleaning solutions.

Accordingly, it is an object of the present invention to provide a method of regeneration of spent alkaline or acid cleaning solutions which is simple to operate, and provides effective flocculation of the solid salts which are precipitated when chemical treatment agents are added to the solution.

It is another object of the present invention to provide a method for regenerating spent alkaline or acid cleaning solutions wherein large-sized and hard flocs can be formed by the use of small amounts of chemicals.

Another object of this invention is to provide a process for regenerating spent alkaline or acid cleaning solutions wherein dispersed residues, which have been removed from dirty surfaces are removed so that the residues do not react with caustic or acid, which would thus tend to reduce cleaning efficacy, and so that available active caustic or acid concentration remains higher with less top-over needed to maintain concentration.

Yet another object of this invention is to provide a process for regenerating spent alkaline or acid cleaning solutions wherein the soil load is kept at low level, so that such cleaning solutions are more active and clean faster.

Still another object of this invention is to provide a process for regenerating spent alkaline or acid cleaning solutions in which organic soil, which has low heat transmittance and tends to foul heating surfaces, is removed so that the regenerated solutions may be heated while using less energy and while not fouling surfaces.

A still further object of this invention is to provide a process for regenerating spent alkaline or acid cleaning solutions in which soiled solutions which have higher viscosity that impair soil penetration and removal are treated to remove the soil so that regenerated solutions flow better and penetrate more efficiently.

(b) Statement of Invention

The present invention provides a process for regenerating used alkaline or acidic or neutral cleaning solution comprising the steps of: (a) preconditioning the spent solution; (b) adding an absorbent material to the preconditioned solution to provide an interactive solution; (c) precipitating undesirable materials from the interactive solution by adding an anionic and a cationic polymeric flocculating agent thereto, in a sequence of steps consisting essentially of (i) adding one of an anionic or a cationic polymeric flocculating agent to the interactive solution to provide a reactive solution, (ii) thoroughly mixing the reactive solution, and (iii) adding the other of the anionic or the cationic flocculating agent, thereby precipitating insoluble salts as flocs; and (d) subjecting the reactive solution containing such flocs to a solid/liquor separation.

(c) Other Features of the Invention

In the first, or preconditioning step, the procedure depends to some extent on whether the solution is alkaline or acidic. The choice of alkali material is such as to be water soluble and slow reacting, and to produce a filterable hydrate. If the solution is alkaline, such preconditioning may be carried out by the addition of suitable chemicals, e.g., the salts or hydroxides of the alkaline earth metals, e.g., calcium salts or hydroxides and magnesium salts or hydroxides. Other agents which may further be used in the preconditioning, and/or absorbent and/or precipitation steps, include an alkaline earth metal hydroxide. One suitable alkaline earth metal hydroxide may be calcium hydroxide. Other suitable treatment agents, e.g., sodium carbonate or sodium hydroxide may also be used. Yet other suitable materials include alkali metal and alkaline earth metal carbonates, e.g., $Na_2CO_3$, alkaline earth metal hydroxides, e.g., $Ca(OH)_2$, alkaline earth metal oxides, e.g., CaO, alkali metal aluminates, alkali metal ferrates, and mixtures thereof.

Organic precipitants, e.g., polysulfones, may also be used.

If the solution is neutral or acidic, the salts of Group III of the Periodic Table or of the first transition series of the Periodic Table may be used. Examples include alum, aluminum sulfates, and iron sulfates. In addition, e.g., polyaluminum chloride or aluminum acetate may also be used.

For neutral or basic solutions, the chemical precipitation may also be accompanied by the conjoint use of weighting agents, e.g., calcium carbonate or diatomaceous earths.

The preconditioning may alternatively be carried out by oxidation using a suitable oxidizing agent. Examples include peroxyborates, e.g., sodium peroxyborate; peroxycarbonates, e.g., sodium mono- or di-peroxycarbonate; peroxides, e.g., hydrogen peroxide, sodium peroxide, and barium peroxide; and persulfates, e.g., sodium peroxydisulfate.

Alternatively, the preconditioning may be achieved by heating to a temperature above about 55° C.

In the second step to provide the interactive solution, among the absorbent materials which may be used are those which function to absorb some of the soluble materials and to provide a nuclei to gather suspended particles of appropriate charges. Among such material are bentonite, e.g., sodium bentonite, calcium bentonite and attapulgite clay.

One suitable bentonite is sodium bentonite, a preferred sodium bentonite, being the Wyoming or Black Hills type of swelling bentonite. This type of bentonite is composed almost entirely of particles of montmorillonite that expand or swell greatly when dispersed in water.

The Wyoming or Black Hills type bentonite, are colloidal particles which are typically hydrophilic in character. That is, each particles is hydrated or solvated, and made bulky and loose-textured by firmly bound water which penetrates between, and expands greatly, the lattice sheets making up each unit of a bentonite particle. The bound water also forms a thick seat which encloses each unit.

Sodium bentonite possesses the following characteristics which relate more specifically to the practice of the present invention: When suspended in water which contains unsubstantial quantities of electrolytes or ionizable substances, sodium bentonite swells to as much as thirty times its original volume to form a gelatinous paste which, upon further dilution with water, if need, can be dispersed by stirring to form a colloidal sol. In this sol the disperse phase comprises negatively charged, highly hydrated bentonite particles of the type hereinabove described. In the absence of some suitable flocculating agent such a sol will show no separation of the disperse phase for an indefinite period of time due to the mutual repulsion of the outer, cationic portion of the cations being carried by the "bound" water surrounding each bentonite particle. If however, an electrolyte, or ionizable material capable of furnishing cations, be added in suitable proportion to such a bentonite sol, there ensues a sufficient neutralization of the anions, the anions being carried by the bentonite particles themselves, and concomitant reduction in their mutual repulsion, so that groups of the particles coalesce to form aggregates of varying sizes. In the case of a majority of the bentonite particles, this aggregation extends until there is a rapid formation of visible flocs. The sodium bentonite may be used in conjunction with sodium carbonate to help precipitate excess magnesium and/or calcium ions.

In the third, or precipitation or flocculation step, it is necessary to make use of polymeric flocculating agents. An important feature in this precipitation step in the present invention is the use of alternating charges in the flocculating agents added, i.e. progressing from anionic to cationic to nonionic, etc. or vice versa. Anionic polymer coagulants which may be used singly or in combination include, for example, alginic acid, alginates, e.g., sodium alginate, sodium polyacrylate, maleate copolymers, and partial hydrolyzates of polyacrylamide, anionic polyacids and salts thereof and may be, e.g., an alkali metal salt of a simple or complex oligomer of acrylic or methacrylic acid, low-viscosity sodium carboxymethylcellulose or an oligomeric sulphonate. In neutral or acid solution, chitosan may also be used.

The cationic coagulant may be a polyamide or a polyacrylate.

In one way of carrying out such precipitation step one coagulant (e.g., the anionic coagulant) is added to the incoming preconditioned and absorbent-treated solution. Such solution is then thoroughly mixed. The other coagulant is then added to the liquor to cause precipitation of the insoluble salts, which are then separated out. This order may, or course, be reversed.

The final solids/liquids separation step also may include an oxidation step, and this may be achieved by filtration to remove particles of 5–0.1 μ, using, e.g., carbon sand, a membrane or a stainless steel membrane. Conventional filter sands may also be used. A catalyst, e.g. a conventional redox catalyst or a powdered metal or metal oxide, may be added to complete the oxidation of any further impurities in the solution.

As generally understood, filtration is the removal of suspended particles from a liquid, e.g., by forcing the liquid under pressure differential through a filter medium. Slow sand filters were the first water filter structures devised to accomplish this on a large scale and in many ways simulated percolation through naturally occurring sand such as that of the banks or galleries along the edges of rivers or other water sources.

Filtering may also be achieved through structures containing much coarser sand acting largely as straining devices, (known as "rapid sand filters"). It is to be appreciated that filters have little inherent clarifying capacity of themselves and the basis for clarification has been provided by prior treatment appropriate chemicals as above described. That is, the suspended matter therein was treated to collect or coalesce into sufficiently large agglomerates so as to settle out and be substantially removed, (e.g., by primary filtration) in advance of the secondary filtration. Such a process may include absorption by means of active agents flocculation by flocculating polymer, setting in sedimentation basins to remove the agglomerates and finally the primary filter, which takes out the larger sized contaminants.

In order to prevent clogging of the openings and eventually slowing down or completely stopping the flow of liquid through the filter, a small amount of filter aid may be added to the liquid to be filtered.

In order to increase the initial efficiency of the filtering process, a pre-coat of filter aid particles may be provided on the filter in addition to the incorporation of particles within the liquid to be filtered. The materials most generally used as filter aids include diatomaceous silica, perlite, other siliceous materials, carbon, and fibrous matter, e.g., cellulose.

Other filter aids involve the step of preconditioning the filter feed by adding thereto small amounts of powdered active magnesium oxide and pulverulent filter aids, earlier described, preferably in a pre-filter tank having mild agitation and nominal retention, and then filtering by any standard type of filter aid filter technique.

BRIEF DESCRIPTION OF THE DRAWING

The accompanying drawing is a flow chart of the regeneration process of the present invention.

DESCRIPTION OF A PREFERRED EMBODIMENT OF THE INVENTION

As seen in the drawing, after the cleaning solution is used in the cleaning step 11 it results in a spent solution, at 12, to be regenerated. The regeneration take effect in zone 13.

The first step, in zone 13, is to provide a preconditioned solution 14 by the addition of suitable agents, as previously described, at 15, or by the heating of the solution also as previously described.

The absorption step, at 16, also, as previously described, involves the addition of a suitable absorbent material, as previously described, at step 17.

The next step, the precipitation of undesirable materials and subsequent flocculation at step 18, is carried out by the addition of suitable reagents, as previously described, at step 19. This also includes the progressively alternative use of flocculating agents, in any order from anionic to non-ionic to cationic, or vice versa.

After the flocculation step at 18 the solution is subjected to a final solids/liquids separation step. This may be achieved progressively by a settling step 20 followed by a primary filtration step 22 in primary filter 21, to provide a filtered solid waste at 23, which may be discarded as desired, at 24 and a preliminary filtered solution at 25.

The next step involves the final separation and oxidation stage at 27 in zone 26. The residue from the solution so filtered may also be adequately disposed of as desired at 28. This results in a regenerated solution at 29.

The regeneration solution may be subjected to the option step of chemical make-up at 30 by the addition of concentrated chemicals at 31. This then provides a reusable cleaning solution at 32.

Important advantages of the present invention include the following:

Regenerates and recycles spent alkaline, acid or detergents solutions and their additives.

Maintains cleaning solutions at peak efficiency.

Significantly reduces chemical, organic, and BOD/COD pollution.

Saves on chemical usage.

Saves on water usage.

Saves on energy.

Reduces cleaning time to increase overall productivity.

Decrease or eliminate the need for waste water treatment facilities.

Conclusion

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A process for regenerating a spent alkaline or acidic or neutral cleaning solution comprising the steps of:

(a) pre-conditioning said spent solution;

(b) adding an absorbent material to said preconditioned solution to provide an interactive solution;

(c) precipitating undesirable materials from said interactive solution by adding an anionic and a cationic polymeric flocculating agent thereto, in a sequence of steps consisting essentially of (i) adding one of said anionic or a cationic polymeric flocculating agent to said interactive solution to provide a reactive solution, (ii) thoroughly mixing said reactive solution, and (iii) adding the other of said anionic or said cationic flocculating agent, thereby to precipitate insoluble salts as flocs; and (d) subjecting said reactive solution containing said flocs to a solid/liquid separation.

2. The process of claim 1 wherein said spent solution is alkaline; and wherein said preconditioning is carried out by the addition of an agent selected from the group consisting of alkali metal aluminates, alkali metal ferrates, alkali metal hydroxides, alkaline earth metal salts, alkaline earth metal hydroxides, alkali metal carbonates, alkaline earth metal oxides and mixtures thereof.

3. The process of claim 2 wherein said pre-conditioning step (a) is carried out in the presence of a weighting agent.

4. The process of claim 3 wherein said weighting agent comprises calcium carbonate or diatomaceous earths.

5. The process of claim 2 wherein said alkaline earth metal hydroxides are selected from the group consisting of calcium hydroxide and magnesium hydroxide.

6. The process of claim 2 wherein said alkaline earth metal salts are selected from the group consisting of calcium salts and magnesium salts.

7. The process of claim 2 wherein said agent is calcium oxide.

8. The process of claim 2 wherein said agent is sodium carbonate.

9. The process of claim 1 wherein said absorbent material is a bentonite or an attapulgite.

10. The process of claim 9 wherein said bentonite is sodium bentonite.

11. The process of claim 1 wherein said anionic polymeric flocculating agent is selected from the group consisting of alginic acid, alginates, sodium alginate, sodium polyacrylate, maleate copolymers, partial hydrolyzates of polyacrylamide, anionic polyacids and salts thereof, an alkali metal salt of a simple oligomer of acyclic acid, an alkali metal salt of a simple oligomer of methacrylic acid, an alkali metal salt of a complex oligomer of acrylic acid, an alkali metal salt of a complex oligomer of methacrylic acid, a low-viscosity sodium carboxymethylcellulose and an oligomeric sulphonate.

12. The process of claim 11 wherein said cationic polymeric flocculating agent is selected from the group consisting of a polyamide and a polyacrylate.

13. The process of claim 1 wherein said cationic polymeric flocculating agent is selected from the group consisting of a polyamide, and a polyacrylate 14. The process of claim 1 wherein said separation is achieved by filtration.

15. The process of claim 14 wherein said filtration is carried out using a fine sand filter, a membrane filter, a stainless steel membrane filter, or a coarse sand filter.

16. The process of claim 1 wherein an anionic polymeric flocculating agent is added to said interactive solution to provide said reactive solution; said reactive solution is thoroughly mixed, thereby to provide a mixed solution; a cationic coagulant is added to said mixed solution to cause insoluble salts to be precipitated and thereby providing a liquid; and said precipitated insoluble salts are separated from said liquid.

17. The process of claim 16 wherein said anionic polymeric flocculating agent is selected from the group consisting of alginic acid, alginates, sodium alginate, sodium polyacrylate, maleate copolymers, partial hydrolyzates of polyacrylamide, anionic polyacids and salts thereof, an alkali metal salt of a simple oligomer of acyclic acid, an alkali metal salt of a simple oligomer of methacrylic acid, an alkali metal salt of a complex oligomer of acrylic acid, an alkali metal salt of a complex oligomer of methacrylic acid, a low-viscosity sodium carboxymethylcellulose and an oligomeric sulfonate.

18. The process of claim 1 wherein a cationic polymeric flocculating agent is added to said interactive solution to provide said reactive solution; said reactive solution is thoroughly mixed, thereby to provide a mixed solution; an anionic polymeric flocculating agent is added to said mixed reactive solution to cause insoluble salts to be precipitated, and thereby providing a liquid; and said precipitated salts are separated from said liquid alkaline earth metal oxide.

\* \* \* \* \*